United States Patent
Fontanet et al.

(10) Patent No.: US 12,050,116 B2
(45) Date of Patent: Jul. 30, 2024

(54) REDUCED-WIDTH INDUCTIVE POSITION SENSOR

(71) Applicant: VITESCO TECHNOLOGIES GMBH, Hannover (DE)

(72) Inventors: Alain Fontanet, Toulouse (FR); Jean-Louis Roux, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 165 days.

(21) Appl. No.: 17/432,027

(22) PCT Filed: Mar. 19, 2020

(86) PCT No.: PCT/EP2020/057554
§ 371 (c)(1),
(2) Date: Aug. 18, 2021

(87) PCT Pub. No.: WO2020/193344
PCT Pub. Date: Oct. 1, 2020

(65) Prior Publication Data
US 2022/0136868 A1    May 5, 2022

(30) Foreign Application Priority Data
Mar. 22, 2019    (FR) ...................... 1902981

(51) Int. Cl.
*G01D 5/20* (2006.01)
*G01B 7/30* (2006.01)
*G01F 23/26* (2022.01)

(52) U.S. Cl.
CPC ............. *G01D 5/2053* (2013.01); *G01B 7/30* (2013.01); *G01F 23/26* (2013.01)

(58) Field of Classification Search
CPC ...... G01F 23/26; G01D 5/204; G01D 5/2053; G01D 5/2073; G01D 5/2086; G01B 7/30
See application file for complete search history.

(56) References Cited

U.S. PATENT DOCUMENTS 5,815,091 A * 9/1998 Dames ................. G01D 5/2073
340/870.34
6,011,389 A * 1/2000 Masreliez ............ G01D 5/2053
324/207.17

(Continued)

FOREIGN PATENT DOCUMENTS

| CN | 1582385 A | 2/2005 |
|---|---|---|
| CN | 1726518 A | 1/2006 |

(Continued)

OTHER PUBLICATIONS

International Search Report and Written Opinion of the ISA for PCT/EP2020/057554 dated Jun. 18, 2020, 10 pages.

(Continued)

*Primary Examiner* — Steven L Yeninas
(74) *Attorney, Agent, or Firm* — NIXON & VANDERHYE

(57) ABSTRACT

Disclosed is an inductive position sensor including, on the one hand, a primary winding and, on the other hand, at least two secondary windings each having a plurality of turns formed of a succession of sides and produced on two opposite faces of a printed circuit board. Two pairs of two adjacent sides of each turn of at least one secondary winding form a first point directed toward a first longitudinal end and a second point directed toward a second longitudinal end of the printed circuit board, a projection on a plane of the printed circuit board of the two adjacent sides of each pair defining between them an acute projected angle.

15 Claims, 4 Drawing Sheets

(56) References Cited

U.S. PATENT DOCUMENTS

| | | |
|---|---|---|
| 2004/0130318 A1 | 7/2004 | Saltsov et al. |
| 2004/0227644 A1* | 11/2004 | Lin ............... G01D 5/2073 340/870.3 |
| 2005/0030010 A1 | 2/2005 | Jones et al. |
| 2005/0122197 A1* | 6/2005 | Aoki ............... G01D 5/2086 336/115 |
| 2006/0250128 A1* | 11/2006 | Tahara ............ G01D 5/2086 324/207.25 |
| 2007/0001666 A1* | 1/2007 | Lee ................. G01D 5/2053 324/207.16 |
| 2007/0018658 A1* | 1/2007 | Hayashida ........ G01B 3/18 324/650 |
| 2007/0139040 A1 | 6/2007 | Jones et al. |
| 2013/0069637 A1* | 3/2013 | Kobayashi ....... G01D 5/208 324/207.17 |
| 2014/0225600 A1 | 8/2014 | Fontanet et al. |
| 2015/0292910 A1* | 10/2015 | Sasaki ............. G01D 5/2046 324/207.15 |
| 2015/0369631 A1* | 12/2015 | Cheung ........... G01D 5/2013 336/200 |
| 2016/0238412 A1 | 8/2016 | Germann et al. |
| 2017/0146572 A1 | 5/2017 | Urankar |
| 2017/0345559 A1 | 11/2017 | Vanukuru |
| 2018/0274946 A1 | 9/2018 | Maniouloux et al. |
| 2018/0274947 A1 | 9/2018 | Maniouloux et al. |
| 2018/0274948 A1 | 9/2018 | Maniouloux et al. |
| 2020/0232834 A1* | 7/2020 | Liew ............... F01M 11/12 |

FOREIGN PATENT DOCUMENTS

| | | |
|---|---|---|
| CN | 103983283 A | 8/2014 |
| CN | 105659053 A | 6/2016 |
| CN | 107037251 A | 8/2017 |
| CN | 107407576 A | 11/2017 |
| CN | 107407577 A | 11/2017 |
| CN | 107452710 A | 12/2017 |
| CN | 107532924 A | 1/2018 |
| FR | 3 002 034 | 8/2014 |
| FR | 3 068 464 | 1/2019 |
| WO | 2019/002779 | 1/2019 |

OTHER PUBLICATIONS

Office Action issued in Chinese Patent Application No. 202080022299.4 dated Sep. 25, 2023.

* cited by examiner

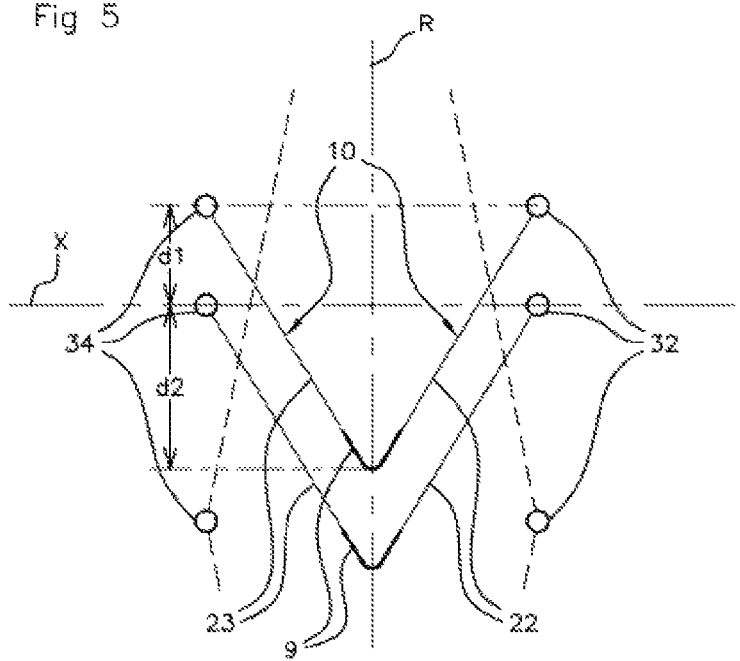
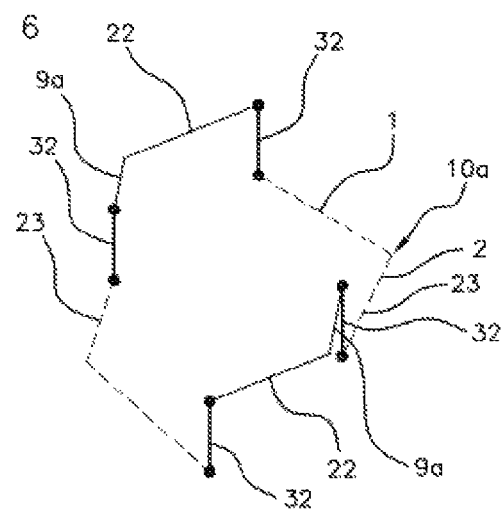
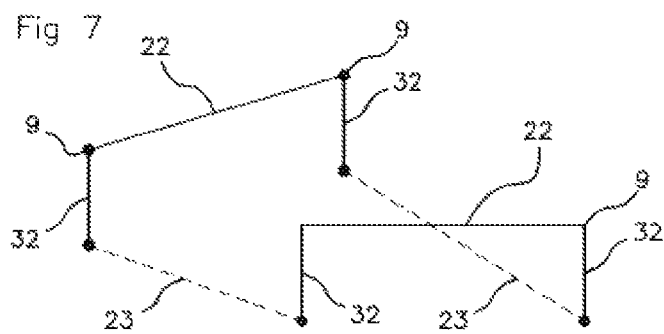

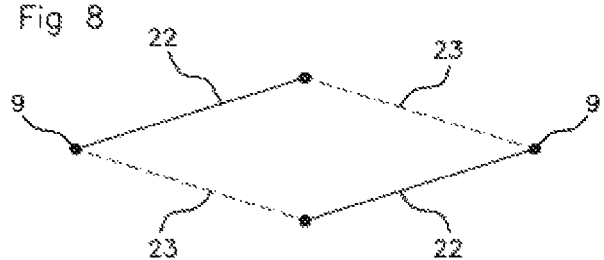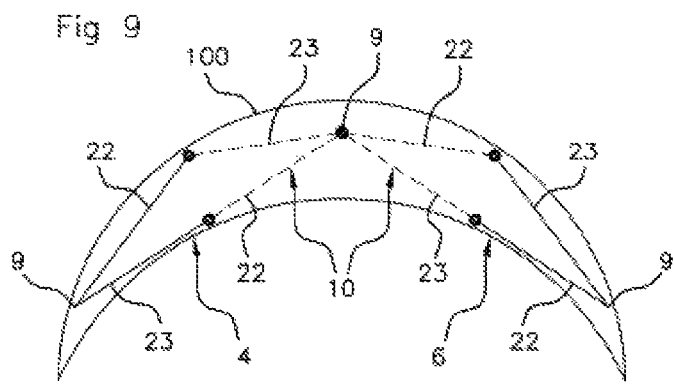

REDUCED-WIDTH INDUCTIVE POSITION SENSOR

This application is the U.S. national phase of International Application No. PCT/EP2020/057554 filed Mar. 19, 2020 which designated the U.S. and claims priority to FR Patent Application No. 1902981 filed Mar. 22, 2019, the entire contents of each of which are hereby incorporated by reference.

BACKGROUND OF THE INVENTION

Field of the Invention

The present invention relates to a reduced-width inductive position sensor that can be used in particular, but without limitation, to a liquid level sensor in a tank, for example a tank for brake fluid, windshield washer fluid, lubricating oil or coolant in a motor vehicle.

Description of the Related Art

It is known practice to use an inductive position sensor to determine the position of a mechanical part, or of any other element, without requiring contact with the part of which it is desired to ascertain the position. This advantage is such that these sensors have numerous applications in a wide variety of industries.

Such sensors are also used in consumer applications such as, for example, the automotive field. However, these sensors may be used in a wide variety of other fields.

The operating principle of an inductive sensor is based on the variation in coupling between a primary winding and secondary windings of a transformer operating at high frequency and without the use of a magnetic circuit. The coupling between these windings varies with the position of an electrically conductive moving part, which is generally referred to as the "target".

Specifically, currents induced in the target modify the voltages induced in the secondary windings. By adjusting the configuration of the windings and with knowledge of the current injected into the primary winding, measuring the voltage induced in the secondary windings allows the position of the target to be determined.

To incorporate such an inductive sensor into a device, in particular an electronic device, it is known practice to produce the transformer mentioned above on a printed circuit board. The primary winding and the secondary windings then consist of tracks routed on the printed circuit board. The primary winding is then for example supplied with power by an external source and the secondary windings are then subject to current induced by the magnetic field produced by a current flowing through the primary winding.

The target, which is a conductive, for example metal, part, may be simple in shape. It may in particular be a part cut from a metal sheet. To produce a linear sensor, the target is for example cut rectangularly while for a rotary sensor, it will be cut for example in the shape of an angular sector with a radius and angle suited to the motion of the part.

Generally, two sets of secondary windings are designed so as to acquire, over one complete travel of the sensor, sine and cosine functions of the position of the target. Such functions (cos and sin) are well known and may easily be processed by an electronic system.

By determining the ratio of the sine to the cosine and then applying an arctangent function, an image of the position of the target is obtained. The argument of the sine and cosine functions is a linear (or affine) function of the position of the target, the travel of which then represents a greater or lesser portion of the spatial period of these trigonometric functions.

To obtain induced voltages that can be measured reliably, it is preferable to have either a large number of turns or turns of large size. The second option is not compatible with producing a compact sensor. Because of this, the choice is generally made to have a large number of turns.

To limit the space occupied on the printed circuit board, it has been proposed to produce turns for forming secondary windings on two distinct layers. To achieve this, vias passing through the printed circuit board should be produced in order to allow the turns thus produced to be connected.

One particularly advantageous form of such an inductive detection sensor has been disclosed in document FR-B-3 002 034.

A novel application of an inductive sensor relates to the measurement of a liquid level in a tank.

Specifically, it is known practice to use magnetic sensors with one or more magnets and Hall effect cells as level sensors. A float bearing a magnet passes in front of a set of Hall cells arranged linearly and vertically. The Hall cells measure the value of the magnetic field and indicate the position of the float, and therefore the liquid level. The shape of this set is elongate and very narrow. The float is annular in shape and is placed around the sensor.

This type of sensor has the notable drawback of being very broadly sensitive to any low-frequency or near-static magnetic field, for example from magnets that can be found inside a hybrid or electric motor vehicle, which makes it unsuitable for performing its role in increasingly electrified motor vehicles.

There is therefore a need to improve the precision, linearity and freedom from mechanical faults of this level sensor without increasing bulk and keeping the typical shape of this type of sensor while making it insensitive to external magnetic fields.

There was therefore the idea to use an induction-based detection sensor as a level sensor to replace the Hall effect sensor of the prior art. However, it is very difficult to design a very narrow inductive sensor.

Without this being limiting, the desired size of such a level sensor is 5 millimeters wide while the width of an inductive sensor is typically 10 millimeters, which prevents the use of an inductive sensor under these conditions.

The problem underlying the present invention is that of designing an inductive position sensor with a reduced width which may promote its employment in new applications, in particular as a level sensor in a liquid tank.

SUMMARY OF THE INVENTION

To that end, the present invention relates to an inductive position sensor comprising, on the one hand, a primary winding and, on the other hand, at least two secondary windings each consisting of a plurality of turns formed of a succession of sides and produced on two opposite faces of a printed circuit board, each secondary winding having turns that each have substantially the same shape and said turns being aligned in a direction referred to as longitudinal with respect to the printed circuit board, each time with an offset in the longitudinal direction, each of said turns extending symmetrically over the two opposite faces of the printed circuit board by way of symmetrical portions connected by vias, noteworthy in that two pairs of two adjacent sides of each turn of at least one secondary winding form a first point directed toward a first longitudinal end and a second point directed toward a second longitudinal end of the printed circuit board, a projection on a plane of the printed circuit board of the two adjacent sides of each pair defining between them an acute projected angle.

The technical effect is that of obtaining an inductive position sensor of reduced width in comparison with a sensor of the prior art. Instead of each longitudinal end of a secondary turn having a base extending transversely to the sensor, a sensor according to the present invention has, at each longitudinal end of a turn of a secondary winding, a sharp or more or less rounded point.

There are two preferred embodiments of the present invention. In a first embodiment, the two sides of the secondary turn forming a point are in one and the same plane on one and the same face of the printed circuit board. In a second embodiment, the two sides of the secondary turn forming a point are in two superposed planes, each of the planes being located on one of two opposite faces of the printed circuit board. In this second embodiment, a via makes the connection between the two sides at the apex of the acute angle of each point.

It is for this reason that reference is made to a projection on a plane of the printed circuit board of the two adjacent sides of each pair defining between them an acute projected angle to include the second embodiment; the two sides of the acute angle of the first embodiment are coincident with their projection and therefore this first embodiment is also covered by this wording.

Just one of the secondary windings may have such flattened turns at an acute angle, but it is highly advantageous for the sensor to have both of its secondary windings with flattened turns comprising longitudinal end points.

Advantageously, the two adjacent sides of each pair define between them a rounded section as a point. This is a common measure in the manufacture of secondary turns so that the material of the secondary turn is not bent too greatly and broken.

For the second embodiment, a rounded shape is less important since the two sides of the acute angle are not in one and the same plane and there is a via at the apex of the acute angle in order to connect the two sides of the acute angle.

Advantageously, the projected angle is between 1 and 45°. The smaller this angle, the smaller the width of each secondary turn and consequently of the sensor.

Advantageously, said at least two secondary windings are each arranged symmetrically with respect to a median axis perpendicular to a longitudinal axis of the printed circuit board and in that the electromotive forces induced in the turns of a first secondary winding oppose the electromotive forces induced in the turns of at least a second secondary winding.

Advantageously, said at least two secondary windings each have two pairs of two adjacent sides of each turn of at least one secondary winding pointing toward a first longitudinal end and a second longitudinal end, respectively, of the printed circuit board.

Advantageously, each turn of said at least one secondary winding is in the shape of a rhombus when projected on the plane of the printed circuit board.

According to the first embodiment, the rhombus shape is already present without projection on a plane of the printed circuit board, the two sides of the acute angle being in the same plane and being coincident with their projection, which is not the case for the second embodiment where the rhombus shape is not obtained on a plane directly but rather only by projection.

Thus, to reduce the width of a sensor by reducing the width of the turns of at least one secondary winding, a turn shape is used with acute angles at the longitudinal ends. Starting from a periodic winding structure, it is thus possible to design at least one of the two secondary windings with turns that have highly flattened rhombus shapes.

Such a rhombus shape is derived from a hexagonal shape but without the base present for this hexagonal shape shown by the two closest examples of prior art, which base increased the size of the turns in the direction of the width of the secondary winding formed by these turns. This makes it possible to minimize the width of the pattern of the turns so as to be able to produce a sensor pattern.

Advantageously, the primary winding surrounds said at least two secondary windings and has turns comprising linear portions extending longitudinally.

In the first optional embodiment of the invention, the two adjacent sides of one and the same pair are arranged on one and the same face of the printed circuit board, the two pairs of two adjacent sides being located, respectively, on opposite faces of the printed circuit board, each of said turns having a first part formed of one of the two pairs and a second part formed of the other of the two pairs, the first part of one turn being connected to the second part of the same turn by a first via passing through the printed circuit board, the second part of the turn being connected to a first part of a neighboring turn by a second via passing through the printed circuit board.

In the second optional embodiment of the invention, the two adjacent sides of one and the same pair are arranged on opposite faces of the printed circuit board, a via being positioned at the point of the pair, each of said turns taking the form of an alternation of adjacent sides, one adjacent side of which is located on a first face of the printed circuit board and the other adjacent side of which is located on a second face of the printed circuit board opposite the first face.

The advantage of this second embodiment over the first is that it straightens and balances a secondary turn according to the first embodiment which was in two, respectively upper and lower, longitudinal sectors. The flaw with a turn in accordance with the first embodiment is its tilted appearance along its length.

According to the second embodiment, by dividing each sector into two lateral portions that are located at different levels and on opposite faces of the printed circuit board, the pattern of the turn is more balanced lengthwise by no longer being in the shape of two sectors of different heights.

Each sector is divided across lateral portions, with a first portion of the first sector kept the same with respect to a turn according to the first embodiment and a second portion lowered by being placed on the other face of the printed circuit board. For the second sector, a first portion is raised and a second portion is kept the same.

For the two sides forming an acute angle at each longitudinal end of the secondary turn, these two sides are no longer positioned against one and the same face of the printed circuit board but respectively on opposite faces, a via passing through the printed circuit board connecting the two sides at the point forming the apex of the acute angle.

This allows the sensitivity to variation in airgap and the sensitivity to variation in eccentricity to be greatly decreased and the linearity of the sensor to be enhanced for a linear sensor.

For the two preferred embodiments of the present invention, an offset in the longitudinal direction between two neighboring turns is smaller than a distance separating a point of a first part of a turn and an axis passing through the corresponding first and second vias.

Advantageously, the inductive position sensor is a planar linear inductive sensor or a rotary sensor around a target.

A sensor according to the invention may equally be a linear sensor or a rotary sensor by transforming a Cartesian coordinate system into a polar coordinate system.

By producing the pattern on a product such as a flexible printed circuit board, after having deformed it by curving the flexible printed circuit board into a circular arc or into an complete circle, it is possible to make a sensor that can be placed on an at least partial cylindrical surface obtained by curving the printed circuit board.

The present invention relates to a tank containing a liquid, noteworthy in that it comprises, as an inductive level sensor, such an inductive position sensor, the inductive level sensor being associated with a target formed of an electrically conductive part borne by a float at the level of the liquid in the tank.

Lastly, the present invention relates to a motor vehicle, noteworthy in that it comprises at least one such tank.

BRIEF DESCRIPTION OF THE DRAWINGS

Other features, aims and advantages of the present invention will become apparent from reading the detailed description that follows and from examining the appended drawings given by way of non-limiting examples, and in which:

FIG. 5 schematically shows a view from above of two turns of a secondary winding in the form of two half-rhombuses offset heightwise forming part of a position sensor according to the first embodiment of the present invention;

FIG. 6 schematically shows a perspective view of a turn of a secondary winding of a position sensor according to a second example of the prior art;

FIG. 7 schematically shows a perspective view of a turn of a secondary winding of a sensor according to a second embodiment of the present invention, the turn having its point-forming adjacent sides offset heightwise;

FIG. 8 schematically shows a view from above of a turn of a secondary winding of a sensor according to the second embodiment of the present invention, the turn having its point-forming adjacent sides offset heightwise;

FIG. 9 schematically shows a perspective view of a rotary sensor according to a third embodiment of the present invention, the turns of the secondary windings of the sensor being housed in a semi-cylindrical portion delimited by the turns of the primary winding.

DESCRIPTION OF THE PREFERRED EMBODIMENTS

Figure 1:
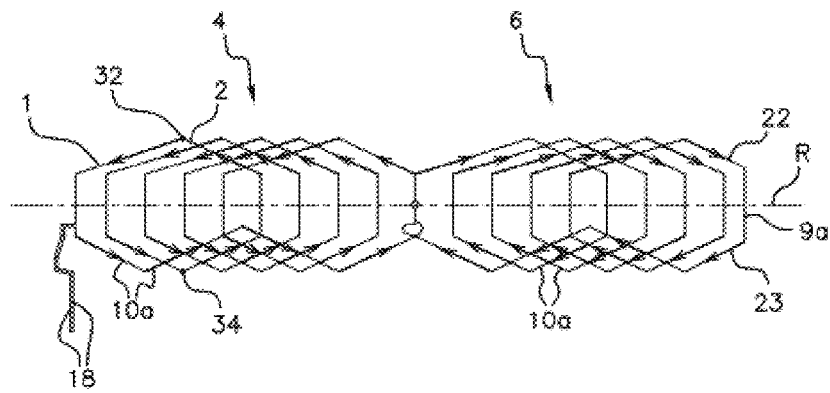
FIG. 1 schematically shows a view from above of two secondary windings of a position sensor according to a first example of the prior art.
Figure 2:
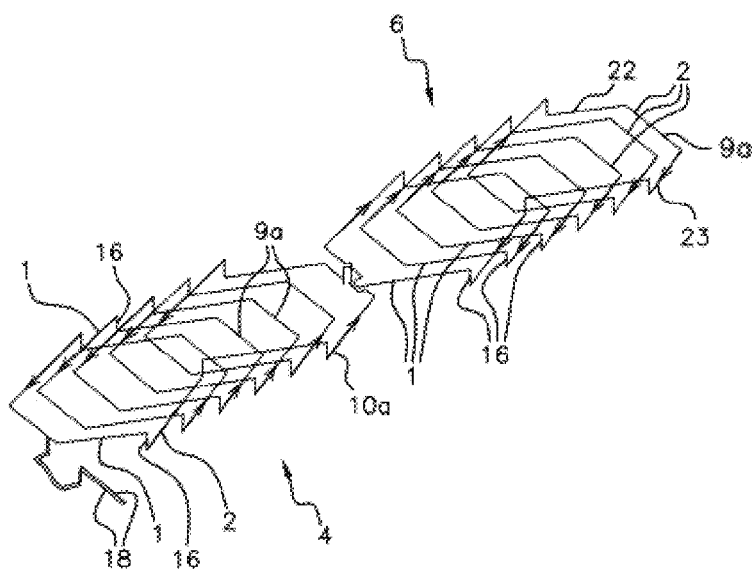
FIG. 2 schematically shows a perspective view of the secondary windings of FIG. 1, therefore for a position sensor according to the first example of the prior art.

FIG. 1 shows a view from above of a first secondary winding 4 and a second secondary winding 6 and FIG. 2 is a perspective view of the secondary windings 4, 6 of FIG. 1 of a position sensor according to a first example of the prior art. Each of these two windings 4, 6 has turns 10a.

It should be noted that for each of these windings, the turns 10a are all substantially similar, but are offset each time with respect to one another in a longitudinal direction illustrated in FIG. 1 by a longitudinal axis R, which is the longitudinal axis of the sensor.

The longitudinal offset between two neighboring turns 10a may be the same each time. Furthermore, and again preferably, the second secondary winding 6, is, when seen from above, symmetrical with respect to the first secondary winding 4 in relation to a transverse plane (not shown) that is orthogonal to the longitudinal axis R. The number of turns 10a of the two windings may be the same and the area of the turns 10a may also be the same.

As shown in FIGS. 1 and 2, in this first example of the prior art, each turn 10a has a first, upper sector 1 and a second, lower sector 2, the first sector 1 corresponding to a track etched on one layer of a printed circuit board (not shown) and the second, lower sector 2 corresponding to a track etched on another, opposite layer of the same printed circuit board.

Electrical continuity between said tracks forming the first sector 1 and the second sector 2 is provided by vias 32 passing through the printed circuit board within which a segment, bearing the reference 16 in FIG. 2, provides electrical continuity.

Electrical continuity between two neighboring turns 10a is provided in the following way: the first, upper sector 1 of a turn 10a is connected to a second, lower sector 2 of a neighboring turn 10a by another via 34 passing through the printed circuit board within which a segment provides said electrical continuity.

Each first, upper sector 1 and each second, lower sector 2 may take, in the embodiment shown in FIGS. 1 and 2, the shape of an irregular half-hexagon with a base 9a at each of its longitudinal ends between two sides 22 and 23.

Only a base on the right of FIGS. 1 and 2 and two sides 22, 23 of the turn 10a are referenced, respectively, as 9a, 22 and 23 but what is stated for this base 9a or these sides 22, 23 is valid for all of the bases between two lateral sides of the turns 10a which are easily identifiable. Not all of the turns are referenced as 10a but can be recognized as such from the referenced turns.

Each first, upper sector 1 and each second, lower sector 2 thus take an overall concave shape, the concavity of the first sector 1 of a turn 10a being oriented inversely with respect to the concavity of the second, lower sector 2 of the same turn. Such a turn 10a may therefore form a hexagon.

More generally, in a secondary winding 4, 6, the concavity of the first, upper sectors 1 is oriented toward a first side and the concavity of the second sectors 2 is oriented toward the side opposite the first side.

When viewed from above, it is possible to see a certain symmetry between a first, upper sector 1 and a corresponding second, lower sector 2 with respect to a straight line passing through the vias 32, 34. The symmetry is not perfect due to the offset between the turns 10a.

Referring back to FIGS. 1 and 2, the segments 16, one of which is referenced in FIG. 2, and the position of which also corresponds to that of the vias 32 to which they are connected, are aligned with two parallel sections that are arranged on either side of a longitudinal axis A of the turns R of FIG. 1 and are perpendicular thereto, i.e. they pass through the printed circuit board.

These two sections are not arranged symmetrically with respect to the longitudinal axis R but are offset in the longitudinal direction defined by the longitudinal axis.

The first secondary winding 4 and the second secondary winding are connected at the level of the transverse plane of symmetry such that, for a given variable magnetic flux, the electromotive forces induced in the first secondary winding 4 oppose the electromotive forces induced in the second secondary winding 6. Within one and the same winding, it should be noted that the electromotive forces induced by a variable magnetic flux in each of the turns 10a are added together.

Lastly, it is possible to see, on the left-hand side of FIGS. 1 and 2, the presence of two connecting tracks 18 allowing the secondary windings 4, 6 to be connected to a device for measuring the voltage at the terminals thereof.

The assembly formed by the first secondary winding 4 and by the second secondary winding 6 make it possible for example to acquire a sine function when a conductive target moves in proximity to these windings. To acquire a cosine function during the movement of the target, it is known practice to use another set of windings that is superposed over the first set of windings.

In FIGS. 1 and 2, it is possible to see the structure of a turn 10a according to the prior art taken in isolation. Such a turn 10a is divided, in one turn 10a length, into a first sector 1, referred to as the upper sector, and a second, lower sector 2, the first and second sectors 1, 2 being complementary and successive. As mentioned above, two vias 32 and 34 are provided on the longitudinal edges of the turn 10a at the respective junction between the longitudinal edges of the first and second sectors 1, 2.

For a turn 10a of the prior art, if the first sector 1 or the second sector 2 is artificially divided, respectively, in one turn 10a width, into first and second portions, these respective pairs of two portions are substantially at the same level by being arranged on one and the same respective face of the printed circuit board, referred to as the first face for the first sector 1, or on the second face for the second sector 2. There is therefore no difference in level between each of the "artificial" pairs of first and second portions for the first and second sectors 1, 2.

Each of the secondary turns 10a has, in its front portion or its rear portion, a flat base 9.

Figure 3:
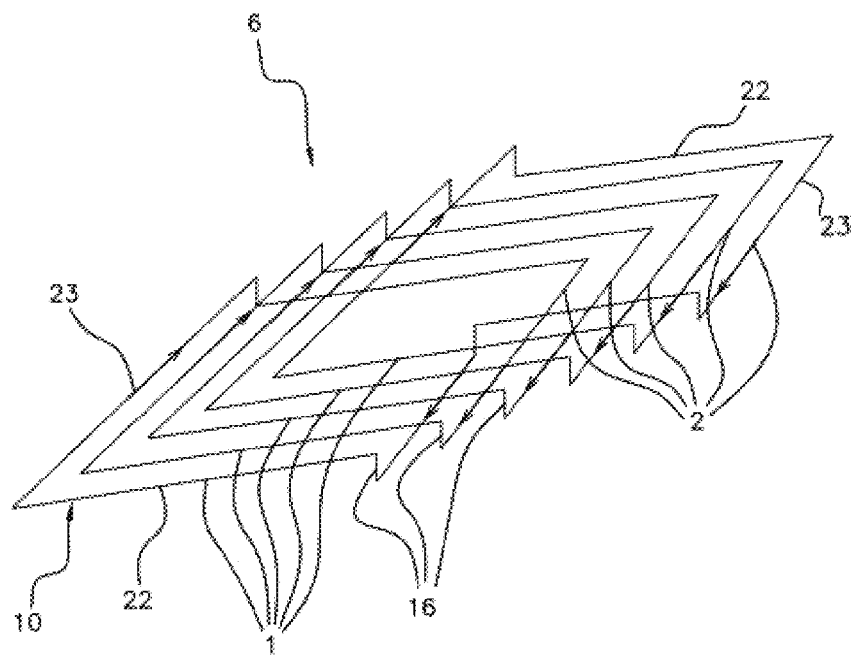
FIG. 3 schematically shows a perspective view of a secondary winding of a position sensor according to a first embodiment of the present invention.
Figure 4:
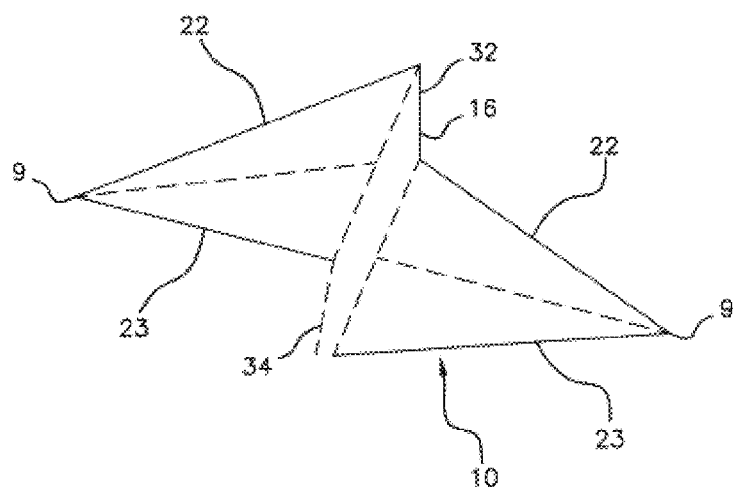
FIG. 4 schematically shows a perspective view of a turn of a secondary winding of a position sensor according to the first embodiment of the present invention.

With reference to FIGS. 3 to 5 for the first embodiment and to FIGS. 7 and 8 for the second embodiment of the present invention while referring to FIGS. 1 and 2 for the references missing from these figures, the present invention relates to an inductive position sensor comprising, on the one hand, a primary winding and, on the other hand, at least two secondary windings 4, 6 each consisting of a plurality of turns 10 formed of a succession of sides 22, 23 and produced on two opposite faces of a printed circuit board.

Each secondary winding 4, 6 comprises turns 10 each taking substantially the same shape and the turns 10 are aligned in what is referred to as a longitudinal direction with respect to the printed circuit board with, each time, an offset d1, visible in FIG. 5, in the longitudinal direction.

Each of the secondary turns 10 extend symmetrically over the two opposite faces of the printed circuit board by way of symmetrical portions connected by vias 32, this differing in the two preferred embodiments of the present invention.

According to the invention, two pairs of two adjacent sides 22, 23 of each turn 10 of at least one secondary winding 4, 6 form a first point 9 directed toward a first longitudinal end and a second point 9 directed toward a second longitudinal end of the printed circuit board. Each point 9, which is advantageously rounded, replaces the base 9a of a turn 10 according to the prior art shown previously in FIGS. 1 and 2.

In FIG. 3, only the rightmost point is referenced as 9 while in FIG. 4, the two points 9 of opposite ends are referenced as 9 and in FIG. 5, the two end points 9 illustrated are referenced as 9 but what is stated for the points 9 that are referenced remains valid for all of the points 9 of a turn 10.

A projection on a plane of the printed circuit board of the two adjacent sides 22, 23 of each pair defines between them an acute projected angle. This applies for the second embodiment of the present invention shown in FIGS. 7 and 8, the adjacent sides 22, 23 next to a point 9 being in the same plane in FIGS. 3 to 5.

In FIG. 3, only the second secondary winding 6 of the sensor is shown but what was stated previously is also valid for the first secondary winding previously referenced as 4 in FIGS. 1 and 2. Each turn 10 of the one or more secondary windings 4, 6 may be in the shape of a rhombus which is planar directly or when projected on the plane of the printed circuit board. This can also be seen in FIGS. 5 and 8.

The primary winding may surround the secondary windings and have turns comprising linear portions extending longitudinally.

For the first embodiment of the present invention, as visible in FIGS. 3 to 5 in particular, the two pairs of two adjacent sides 22, 23 of each turn 10 of at least one secondary winding 4, 6 pointing, respectively, toward a first longitudinal end and a second longitudinal end are in the same plane and therefore coincident with their projection on a plane of the printed circuit board.

A secondary turn 10 according to the first embodiment of the invention is visible in perspective in FIG. 4 and a secondary turn 10 according to the second embodiment is visible in perspective in FIG. 7.

In the first embodiment according to the present invention, as shown in FIGS. 3 to 5, the two adjacent sides 22, 23 of one and the same pair are arranged on one and the same face of the printed circuit board, the two pairs of two adjacent sides 22, 23 being located, respectively, on opposite faces of the printed circuit board in FIGS. 7 and 8.

In both embodiments of the present invention, electrical continuity between two neighboring turns 10 is provided in the same way as in the prior art. The first, upper sector 1 of a turn 10 is connected to a second, lower sector 2 of a neighboring turn by a via 34 passing through the printed circuit board within which a segment provides electrical continuity.

As can be seen in FIG. 4, electrical continuity between the first sector 1 of a turn 10 and the second sector 2 of the same turn 10 is provided by a via 32 passing through the printed circuit board within which a segment provides electrical continuity.

In FIG. 4, it can be seen that the turn 10 is in the shape of a rhombus. A first part of the rhombus or first half-rhombus points toward one longitudinal end of the sensor on a first face of the printed circuit board and a second part of the rhombus or second half-rhombus points toward the other longitudinal end of the sensor on an opposite second face of the printed circuit board.

In this configuration, each of said turns 10 has a first part formed of one of the two pairs 22, 23 and a second part formed of the other of the two pairs 22, 23. The first part of a turn 10 is connected to the second part of the same turn 10 by a first via 32 passing through the printed circuit board, the second part of the turn 10 being connected to a first part of a neighboring turn 10 by a second via 34 passing through the printed circuit board.

In this configuration of the first embodiment of the present invention, the two adjacent sides 22, 23 of one pair are arranged on an opposite face of the printed circuit board than the two adjacent sides 22, 23 of the other pair.

With reference to FIG. 5, an offset d1 in the longitudinal direction between two neighboring turns 10 may be smaller than a distance d2 separating a point 9 of a first part of a turn 10 and an axis x passing through the corresponding vias 32 or 34. This makes it possible to optimize the number of turns 10 over a given area.

In FIGS. 6 to 8, a turn 10*a*, according to the prior art in FIG. 6, or a turn 10, according to the present invention in FIGS. 7 and 8, is shown isolated and not connected to an adjacent turn for simplicity like it was shown in FIGS. 1 and 2 by the via 34.

FIG. 6 shows a sensor according to a second example of the prior art. According to this second example of the prior art, the first sector 1 is divided, in one turn 10*a* width, into a first portion that is arranged on a face of the printed circuit board referred to as the first face and a second portion that is arranged on a face of the printed circuit board opposite the first face, referred to as the second face.

In FIG. 6, each turn 10*a* has two bases 9*a* like in the embodiment according to the first example of the prior art. However, each base 9*a* is located between two sides 22, 23 which are on different faces of the printed circuit board.

The first and second portions of the first sector 1 are complementary. Vias 32 provide the connection between the sides 22, 23 of turn 10 located on different faces of the printed circuit board.

The same applies for the second sector 2 and its base 9*a* between two sides 22, 23 located on different faces of the printed circuit board.

It follows that for each of the two sectors 1, 2 of the turn, this sector 1 or 2 has a difference in level between two lateral portions of the sector 1, 2.

There are therefore no longer upper 1 or lower 2 sectors like provided in the first example of the prior art, but rather sectors 1, 2 dividing the turn 10*a* longitudinally with each sector 1, 2 being distributed over both faces of the printed circuit board.

A portion of the first sector 1 on one face of the board is extended by a portion of the second sector 2 on the other face and vice versa, two point-forming sides 22, 23 of one and the same sector 1, 2 extending over different faces of the printed circuit board.

Starting from this second example of the prior art, for the second embodiment of the present invention, as visible in FIGS. 7 and 8 in particular, the two adjacent sides 22, 23 of one and the same pair are arranged on opposite faces of the printed circuit board, a via 32 being positioned at the point 9 of the pair.

In this configuration, each of said turns 10 takes the form of an alternation of adjacent sides 22, 23, one adjacent side of which is located on a first face of the printed circuit board and the other adjacent side of which is located on a second face of the printed circuit board opposite the first face.

FIG. 7, a perspective view of a turn 10 according to this second embodiment and FIG. 8, a view from above of a turn 10 according to this second embodiment, show a turn 10, two adjacent sides 22, 23 of one and the same sector of which are next to a point 9 of the rhombus, the two sides 22, 23 being in superposed planes.

With reference to all of the figures, in all of the embodiments of the present invention, for a secondary turn 10 of the inductive sensor, the portions of one and the same first or second sector are not necessarily equal in size; what matters is that one and the same magnetic flux flows through them.

The first and second portions of the first sector 1 or, respectively, of the second sector 2 may therefore be divided primarily so that two portions of one and the same sector 1 or 2, for example the first and second portions of the first sector 1 or, respectively, the first and second portions of the second sector 2 receive an equal amount of magnetic flux.

Likewise for the two adjacent sides 22, 23 of each pair forming between them a point 9 of the rhombus directed toward a longitudinal end of the sensor, these two sides may define between them a rounded section as a point, which is shown in FIG. 5, but this is not limiting for this embodiment.

The projected angle of the point 9 of the rhombus directed toward a longitudinal end of the sensor may be between 1 and 45°, preferably being smaller than 20°.

Like for a sensor of the prior art, the sensor may comprise both of its secondary windings 4, 6 or more each arranged symmetrically with respect to a median axis perpendicular to a longitudinal axis R of the printed circuit board. The electromotive forces induced in the turns 10 of a first secondary winding 4 then oppose the electromotive forces induced in the turns 10 of the second secondary winding 6.

The winding or at least one of the two secondary windings 4, 6 may have two pairs of two adjacent sides 22, 23 of each turn 10 of at least one secondary winding 4, 6 with a first point 9 directed toward a first longitudinal end and a second point 9 directed toward a second longitudinal end of the printed circuit board.

In FIGS. 3 to 5, 7 and 8, the turns 10 are shown with relatively planar portions contained in the two superimposed planes but this may differ. Although a linear sensor is illustrated in FIGS. 3 to 5, 7 and 8, as shown in FIG. 9, the inductive position sensor according to the invention may be a rotary sensor 100 in the form of a cylindrical portion.

The alignment of the first and second sectors is not necessarily linear. It may also be a circular, or possibly an elliptical, arc. A person skilled in the art will have understood that this alignment corresponds to the direction of movement of the object of which it is desired to ascertain the position. This is most commonly a linear movement with, in this case, the use of a linear position sensor. However, it may also be a movement following a curved, most commonly circular, trajectory.

A rotary inductive sensor according to the present invention is shown in FIG. 9. The rotary sensor 100 is in the form of a cylindrical portion or ring portion limited to a circular arc in FIG. 9 but may form a complete cylinder or a complete ring.

Such a shape may be obtained by starting from a linear sensor and has a flexible printed circuit board that can be curved to form a circular arc or a complete circle. The rotary sensor 100 has a section bearing the two secondary windings 4, 6 or more and a primary winding surrounding them.

In FIG. 9, a first secondary winding 4 and a second secondary winding 6 are shown without a stack of turns with the turns 10 being offset for simplicity but this stack is present, being similar to the stack shown in FIGS. 1, 2 and 3. The turns 10 of the two secondary windings 4, 6 can extend in the section of the rotary sensor 100 by the two secondary turns 10 having acute angles that are aligned in a radial plane with respect to the rotary sensor 100 which passes through a center O of curvature of the sensor.

A rotary sensor 100 may contain turns according to any one of the two preferred embodiments of the present invention, as described above.

One particularly advantageous application of such a sensor of reduced width owing to the rhombus shape with a relatively small apex angle of each secondary turn may be in a tank containing a liquid, for example a tank for fuel or any product, advantageously in a motor vehicle.

The tank comprises an inductive level sensor as described above as a level sensor. The inductive level sensor is associated with a target formed of an electrically conductive part borne by a float floating at the level of the liquid in the tank.

Lastly, the present invention relates to a motor vehicle comprising at least one tank as described above.

The present invention is not limited to the embodiments described above and to the variants presented by way of non-limiting examples. It also relates to all variants within the scope of a person skilled in the art within the framework defined by the claims hereinafter.

The invention claimed is:

1. An inductive position sensor comprising:
   a primary winding; and
   at least two secondary windings each consisting of a plurality of turns formed of a succession of sides and produced on two opposite faces of a printed circuit board, the turns of each secondary winding each having substantially the same shape and said turns being aligned in a longitudinal direction with respect to the printed circuit board, each time with an offset in the longitudinal direction, each of said turns extending symmetrically over the two opposite faces of the printed circuit board by way of symmetrical portions connected by vias,
   wherein two pairs of two adjacent sides of each turn of at least one of the secondary windings form a first point directed toward a first longitudinal end and a second point directed toward a second longitudinal end of the printed circuit board, a projection on a plane of the printed circuit board of the two adjacent sides of each pair defining between them an acute projected angle that is between 1° and 45°,
   wherein the position sensor is a planar linear inductive sensor,
   wherein each of the first points and the second points of the secondary windings are aligned, a plurality of the first points of respective turns and a plurality of the second points of respective turns being respectively disposed between the adjacent sides of at least one neighboring turn.

2. The position sensor as claimed in claim 1, wherein the two adjacent sides of each pair define between them a rounded section as a point.

3. The position sensor as claimed in claim 2, wherein said at least two secondary windings are each arranged symmetrically with respect to a median axis perpendicular to a longitudinal axis of the printed circuit board and wherein the electromotive forces induced in the turns of a first secondary winding oppose the electromotive forces induced in the turns in at least a second secondary winding.

4. The position sensor as claimed in claim 2, wherein said at least two secondary windings each have two pairs of two adjacent sides of each turn of at least one secondary winding with a first point directed toward the first longitudinal end and a second point directed toward the second longitudinal end of the printed circuit board.

5. The position sensor as claimed in claim 2, wherein each turn of said at least one secondary winding is in the shape of a rhombus when projected on the plane of the printed circuit board.

6. The position sensor as claimed in claim 1, wherein said at least two secondary windings are each arranged symmetrically with respect to a median axis perpendicular to a longitudinal axis of the printed circuit board and wherein the electromotive forces induced in the turns of a first secondary winding oppose the electromotive forces induced in the turns in at least a second secondary winding.

7. The position sensor as claimed in claim 6, wherein said at least two secondary windings each have two pairs of two adjacent sides of each turn of at least one secondary winding with a first point directed toward the first longitudinal end and a second point directed toward the second longitudinal end of the printed circuit board.

8. The position sensor as claimed in claim 1, wherein said at least two secondary windings each have two pairs of two adjacent sides of each turn of at least one secondary winding with a first point directed toward the first longitudinal end and a second point directed toward the second longitudinal end of the printed circuit board.

9. The position sensor as claimed in claim 1, wherein each turn of said at least one secondary winding is in the shape of a rhombus when projected on the plane of the printed circuit board.

10. The inductive position sensor as claimed in claim 1, wherein the primary winding surrounds said at least two secondary windings and has turns comprising linear portions extending longitudinally.

11. The position sensor as claimed in claim 1, wherein the two adjacent sides of one and the same pair are arranged on one and the same face of the printed circuit board, the two pairs of two adjacent sides being located, respectively, on opposite faces of the printed circuit board, each of said turns having a first part formed of one of the two pairs and a second part formed of the other of the two pairs, the first part of one turn being connected to the second part of the same turn by a first via passing through the printed circuit board, the second part of the turn being connected to a first part of a neighboring turn by a second via passing through the printed circuit board.

12. The position sensor as claimed in claim 11, wherein an offset in the longitudinal direction between two neighboring turns is smaller than a distance separating a point of a turn and an axis passing through the corresponding first and second vias.

13. The position sensor as claimed in claim 1, wherein the two adjacent sides of one and the same pair are arranged on opposite faces of the printed circuit board, a via being positioned at the point of the pair, each of said turns taking the form of an alternation of adjacent sides, one adjacent side of which is located on a first face of the printed circuit board and the other adjacent side of which is located on a second face of the printed circuit board opposite the first face.

14. A tank containing a liquid, comprising:
   the inductive position sensor as claimed in claim 1 configured as a level sensor, the inductive level sensor being associated with a target formed of an electrically conductive part borne by a float at the level of the liquid in the tank.

15. A motor vehicle, comprising:
   at least one position sensor as claimed in claim 1.

* * * * *